(12) United States Patent
Lee et al.

(10) Patent No.: US 11,188,795 B1
(45) Date of Patent: Nov. 30, 2021

(54) DOMAIN ADAPTATION USING PROBABILITY DISTRIBUTION DISTANCE

(71) Applicant: Apple Inc., Cupertino, CA (US)

(72) Inventors: Chen-Yu Lee, Santa Clara, CA (US); Daniel Ulbricht, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 108 days.

(21) Appl. No.: 16/665,354

(22) Filed: Oct. 28, 2019

Related U.S. Application Data

(60) Provisional application No. 62/767,005, filed on Nov. 14, 2018.

(51) Int. Cl.
 *G06K 9/62* (2006.01)
 *G06N 3/04* (2006.01)
 *G06N 3/08* (2006.01)

(52) U.S. Cl.
 CPC ......... *G06K 9/6262* (2013.01); *G06K 9/6256* (2013.01); *G06K 9/6268* (2013.01); *G06N 3/0454* (2013.01); *G06N 3/08* (2013.01)

(58) Field of Classification Search
 CPC .. G06K 9/6262; G06K 9/6256; G06K 9/6268; G06N 3/0454; G06N 3/08
 USPC .......................................................... 382/157
 See application file for complete search history.

(56) References Cited

U.S. PATENT DOCUMENTS

| | | | |
|---|---|---|---|
| 2017/0147944 A1* | 5/2017 | Csurka | G06N 3/02 |
| 2018/0024968 A1* | 1/2018 | Clinchant | G06N 3/0454 |
| | | | 706/12 |
| 2019/0180136 A1* | 6/2019 | Bousmalis | G06K 9/4623 |
| 2019/0325299 A1* | 10/2019 | Oliveira Pinheiro | G06N 3/08 |
| 2020/0134442 A1* | 4/2020 | Sim | G06N 3/08 |

OTHER PUBLICATIONS

Saito, "Maximum Classifier Discrepancy for Unsupervised Domain Adaptation", Publication year 2018.*

* cited by examiner

*Primary Examiner* — Juan A Torres
(74) *Attorney, Agent, or Firm* — Thompson Hine LLP

(57) ABSTRACT

Methods and systems that train a neural network to classify inputs using a first set of labeled inputs corresponding to a source domain and adapt that neural network to classify inputs from another domain. The neural network includes a generator network and two or more classifier networks. The generator network is trained to receive inputs and generate features. The two or more classifier networks are trained to classify those features into classes to obtain class probability predictions. The neural network is adapted to a target domain, for example, by training the classifier networks to maximize a Wasserstein distance-based discrepancy between the class probability predictions of the classifier networks, by training the classifier networks to increase Wasserstein distance-based discrepancy or by training the generator network to minimize the Wasserstein distance-based discrepancy between the class probability predictions of the multiple classifier networks, or both.

20 Claims, 5 Drawing Sheets

```
10
```

Train a neural network (generator/classifiers) to classify source domain samples — 12

Adapt the neural network to a target domain by training the classifiers to increase Wasserstein distance-based discrepancy — 14

Adapt the neural network to the target domain by training the generator to decrease Wasserstein distance-based discrepancy — 16

Use neural network to classify items from source or target domains — 18

FIG. 1

DOMAIN ADAPTATION USING PROBABILITY DISTRIBUTION DISTANCE

CROSS-REFERENCE TO RELATED APPLICATION

This application claims the benefit of U.S. Provisional Application Ser. No. 62/767,005 filed Nov. 14, 2018, which is incorporated herein in its entirety.

TECHNICAL FIELD

The present disclosure generally relates to machine learning/prediction systems such as those used for classification and regression, and in particular, to systems, methods, and devices for adapting machine learning/predictions systems from one domain to another domain.

BACKGROUND

Deep learning is a milestone technique in the development of many modern machine learning and computer vision systems. Despite excellent learning capacity and improved generalization, deep learning models still suffer from the challenge of domain shift—a shift in the relationship between the labeled training data in one domain (source domain) and the unseen test data in another domain (target domain). For example, deep convolutional neural networks (CNNs) can be trained to perform accurate classification based on labeled samples. However, such neural networks are usually most accurate when used for classification in the same domains as the samples used during the training. Thus, a neural network trained using images from the United States will generally be less accurate when used on Europe-based input images than on U.S.-based input images.

One way to address this issue is to train neural networks using samples from multiple domains. However, obtaining samples in many domains can be time consuming, expensive, and infeasible. Accordingly, domain adaptation techniques are used to adapt neural networks corresponding to a source domain (e.g., a label-rich domain) for a target domain (e.g., a label-sparse domain). Existing techniques attempt to train a classifier using source domain-based samples that generalize well to a target domain or to adapt classifiers to target domains based on limited information about the target domains.

SUMMARY

In some implementations a neural network is trained to classify inputs using a first set of labeled inputs corresponding to a source domain. The neural network includes a generator network and two or more classifier networks. The generator network is trained to receive inputs and generate features. The two or more classifier networks are trained to classify those features into classes to obtain class probability predictions. For example, the classifier networks may output K-dimensional vectors of logits that are used to generate class probabilities. Thus a K-dimensional probability distribution can be output for a given input by each of the multiple classifier networks.

In some implementations, the neural network is adapted to a target domain. The neural network is trained using inputs corresponding to a target domain and adapted to account for the target domain. In some implementations, such training involves fixing the generator network while training the multiple classifier networks by maximizing a Wasserstein distance-based discrepancy between the class probability predictions of the classifier networks. The phrase "Wasserstein distance" refers to any metric that is assessed by determining or approximating how much change is needed to change one probability distribution to another. Training in this way effectively trains the multiple classifier networks to act as a discriminator. The training can use a sliced Wasserstein distance technique as an approximation to make the computations more feasible or efficient. In some implementations, adapting the neural network additionally or alternatively involves, fixing the multiple classifier networks and training the generator network to generate features that minimize the Wasserstein distance-based discrepancy between the class probability predictions of the multiple classifier networks.

The neural network adapted using one or both of these adaptation techniques may more accurately classify inputs from the target domain then classifiers created via existing domain adaptation techniques. Moreover the training techniques disclosed herein can be applied universally to different use cases without requiring the engineering of a tailored loss function or other context-specific programming. These techniques can be used to train neural networks useful for numerous applications including, but not limited to, image classification, image segmentation, and object detection without requiring the implementer to specifically configure the loss function and other such training parameters for the particular use case. In addition, the techniques may be used to train a neural network using data from a domain in which labeled sample data is readily available or easily generated to a domain in which labeled sample data is less readily available or more difficult to generate. For example, the techniques may adapt a neural network trained with labeled sample data from a synthetic (e.g., virtual 3D world) domain to a real world domain in which such labeled sample data is more difficult or infeasible to obtain.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 1 is a flowchart representation of a method of training a neural network for a source domain, adapting the neural network to a target domain, and using the neural network on either of the source or target domains in accordance with some implementations.

Figure 2:
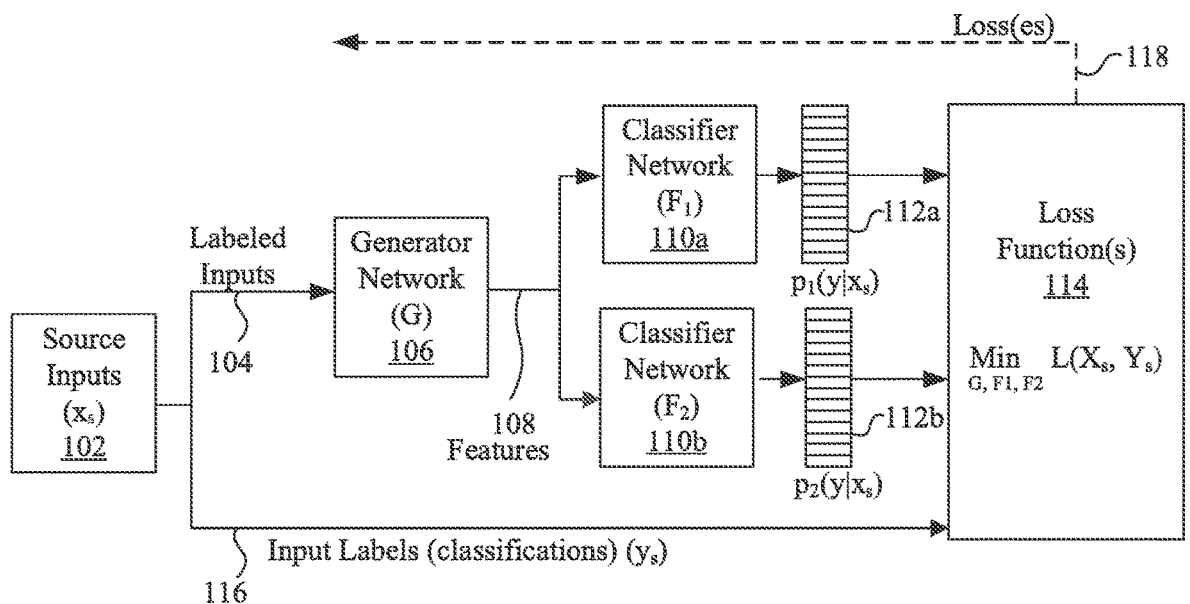
FIG. 2 is a block diagram illustrating a method of training a neural network to classify source samples in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Systems and methods disclosed herein train a neural network and adapt the neural network to a target domain. In some implementations, this involves training a feature generator network and multiple classifier/regression networks, which take feature responses generated from the generator network and produce corresponding logits, respectively. The framework can include three steps performed in any order during optimization. The first step involves training both the generator and classifier/regression networks on the source domain to classify or regress the source samples correctly. The second step involves updating the classifier/regression networks for a fixed generator network to increase discrepancy between the logits on the target set, detecting samples that are outside the support of the task-specific decision boundaries. The third step involves updating the generator to minimize the discrepancy between the logits on the target set, bringing the target feature manifold closer to the source one. Examples of such systems and techniques are discussed next.

FIG. 1 is a flowchart representation of a method 10 of training a neural network for a source domain, adapting the neural network to a target domain, and using the neural network on either of the source or target domains. In some implementations, the method 10 is performed by a device (e.g., device 500 of FIG. 5). The method 10 can be performed at a mobile device, head mounted device (HMD), desktop, laptop, or server device. In some implementations, the method 10 is performed by processing logic, including hardware, firmware, software, or a combination thereof. In some implementations, the method 10 is performed by a processor executing code stored in a non-transitory computer-readable medium (e.g., a memory).

At block 12, the method 10 trains the neural network to classify source domain samples. The neural network combines a generator network and two or more classifier networks. The generator network is trained to receive the inputs and generate features. The multiple (e.g., two) classifier networks are trained to classify the features output from the generator network into classes to obtain class probability predictions. In some implementations, the classifier networks output K-dimensional vectors of logits used to generate class probabilities. The multiple classifier networks are initialized differently, e.g., using different initialization parameters, to ensure the classifier networks end up sufficiently different from one another. The neural network can be trained to classify inputs using a first set of labeled inputs corresponding to a source domain. For example, a set of labeled input images may be used to train the neural network.

FIG. 2 is a block diagram illustrating a method of training neural network to classify source samples in accordance with some implementations. The neural network includes a generator network (G) 106, a first classifier network (F1) 110a, and a second classifier network (F2) 110b. In this example, source labeled inputs $x_s$ 102 provide labeled inputs 104 that are input to the generator network (G) 106. The generator network (G) 106 generates features 108 based on this input. For example, in an implementation in which the inputs are images, the generator network (G) 106 may generate features 108 that correspond to particular regions of the image, particular color qualities of the image or regions of the image, particular relationships within the image or regions of the image, etc.

The features 108 are input to each of the first classifier network ($F_1$) 110a and the second classifier network (F2) 110b. The first classifier network ($F_1$) 110a and the second classifier network ($F_2$) 110b take the features 108 from the generator network (G) 106 and classify them into K classes, that is, they output K-dimensional vectors of logits used to generate class probabilities. In some implementations, class probabilities are obtained by applying a softmax function for the vectors. A K-dimensional probability distribution 112a-b can thus be output for input x by each classifier.

The loss function(s) 114 compare(s) the outputs of the first classifier network ($F_1$) 110a and the second classifier network ($F_2$) 110b with the known classifications (e.g., the input labels 116) of the source inputs $x_s$ 102. The loss(es) 118 determined by the loss function(s) 114 can then be propagated back through the neural network to improve the generator network (G) 106, first classifier network ($F_1$) 110a, and the second classifier network ($F_2$) 110b, e.g., to reduce the loss(es) 118 at each iteration of training.

In some implementations the neural network is trained to minimize softmax cross entropy. The following objective can be used:
, where $$\mathcal{L}(X_s, Y_s) = -\mathbb{E}_{(x_s,y_s)\sim(X_s,Y_s)} \sum_{k=1}^{K} \mathbb{1}_{[k=y_s]} \log p(y|x_s)$$

Some implementations adapt the neural network to the target domain with additional training using samples (e.g., potentially unlabeled samples) from the target domain. Such adaptation can attempt to align source and target features by using the task-specific classifiers as discriminators that considers the relationship between class boundaries and target samples. To do so requires detecting target samples that are far from the support of the source domain that are likely to be misclassified by the classifiers learned from the source samples because they are near the class boundaries. The discrepancy between the multiple classifiers on predictions for the target samples is used to account for target samples that are far from the support of the source domain. The effectiveness of domain adaptation can depend significantly on the reliability of the discrepancy loss. Techniques for using L1 or L2 distance measures to determine such discrepancy are discussed in K. Saito, K. Watanabe, Y. Ushiku, and T. Harada. Maximum classifier discrepancy for unsupervised domain adaptation. In CVPR 2018. Using such distance measures, e.g., using the absolute values of the differences between classifier outputs, as discrepancy loss often does not work well. In contrast, some techniques disclosed herein use Wasserstein distance-based discrepancy to provide improved and more universally-applicable domain adaptation, as described next.

Returning to FIG. 1, at block 14, the method 10 further involves adapting the neural network to the target domain by training the classifiers to increase Wasserstein distance-based discrepancy. This training can involve using a first set of labeled inputs from the source domain and a second set of inputs corresponding to a target domain. In this training, with the generator network fixed, the multiple classifier networks are trained as discriminators by maximizing a Wasserstein distance-based discrepancy between their class probability predictions. By training the classifiers to increase the discrepancy, the classifiers can detect the target samples excluded by the support of the source.

Figure 3:
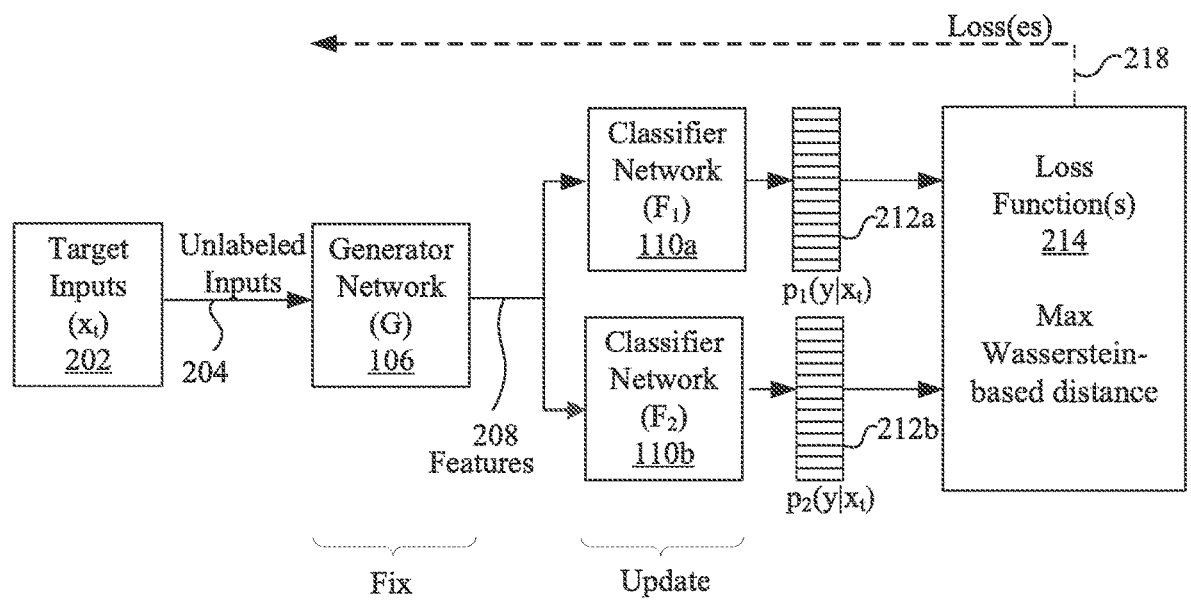
FIG. 3 is a block diagram illustrating a method of adapting the neural network of FIG. 2 to a target domain.

FIG. 3 is a block diagram illustrating a method of adapting the neural network of FIG. 2 to a target domain. The neural network includes the generator network (G) 106, the first classifier network (F1) 110a, and the second classifier network (F2) 110b. In this example, target inputs $x_t$ 202 provides unlabeled inputs 204 that are used. In some implementations, the same number of source inputs $x_s$ 102 and target inputs $x_t$ 202 are used. The samples are inputted to the generator network (G) 106. The generator network (G) 106 generates features 208 based on this input. The features 208 are inputted to each of the first classifier network (F1) 110a and the second classifier network (F2) 110b, which classify the features 208 into K classes, producing K-dimensional vectors of logits that are used to generate class probabilities, e.g., K-dimensional probability distributions 212a-b.

The loss function(s) 214 compare the outputs of the first classifier network ($F_1$) 110a to those of the second classifier network ($F_2$) 110b. In some implementations, the following objective is used:

$$\min_{F_1, F_2} \mathcal{L}(X_s, Y_s) - \mathcal{L}_{adv}(X_t),$$

$$\mathcal{L}_{adv}(X_t) = \mathbb{E}_{x_t \sim X_t}[d(p_1(y|x_t), p_2(y|x_t))]$$

where d denotes a function measuring discrepancy/divergence between the two probabilistic outputs and the notations $p_1(y|x)$ and $p_2(y|x)$ denote the K-dimensional probabilistic outputs for input x obtained by the first classifier network $F_1$ and the second classifier network $F_2$, respectively.

The discrepancy in the loss function provides a measure or estimate of the Wasserstein distance between the probabilistic outputs. In some implementations, the Wasserstein distance is determined by solving an optimal transport formulation. Determining the Wasserstein distance may require Linear Programming, which is non-differentiable. In some implementations, a technique that is differentiable is used as an approximation of linear programming. In some implementations, a sliced Wasserstein distance is determined to provide an approximation with fewer required computations. In some implementations, a Wasserstein distance approximation is computed by projecting the probability distributions into one dimensional space, e.g., so that a feature vector will be represented as points in a one dimensional space, and sorting is used to compute a closed form solution for Wasserstein distance. In some implementations, thus use of such an approximation technique makes the domain adaptation techniques disclosed herein suitable (e.g., fast enough) for implementation on an end user's computing device, e.g., on a personal computer, tablet, mobile device, HMD, etc.

The loss(es) 218 determined by the loss function(s) 214 are propagated back through the neural network to improve the first classifier network ($F_1$) 110a and the second classifier network ($F_2$) 110b, e.g., to reduce the loss(es) 218 at each iteration of the training.

The following discussion briefly reviews the basics of optimal transport and Wasserstein distance, and then explains an exemplary technique for training the domain adaptation framework with such a distance measure. Let $\Omega$ be a probability space and $\mu$, $\nu$ be two probability measures in $P(\Omega)$, the Monge problem seeks for a transport map T: $\Omega \to \Omega$ that minimizes the cost:

$$\inf_{T\#\mu=\nu} \int_\Omega c(z, \mathcal{T}(z)) d\mu(z),$$

where $T_{\#\mu=\nu}$ denotes a one-to-one push-forward from $\mu$ toward $\nu$ ∀Borel subset $A\Omega \times \Omega \to \mathbb{R}^+$ is a geodesic metric such as linear or quadratic cost. However, the solution T* may not always exist due to the assumption of no splitting of the probability measures, for example when pushing a Dirac measure toward a non-Dirac measure. A relaxed version of this task can seek a transportation plan of a joint probability distribution $\gamma \in P(\Omega \times \Omega)$ such that:

$$\inf_{\gamma \in \Pi(\mu,\nu)} \int_{\Omega \times \Omega} c(z_1, z_2) d\gamma(z_1, z_2),$$

where $\Pi(\mu,\nu) = \{\gamma \in P(\Omega \times \Omega) | \pi_{1_\#}\gamma = \mu, \pi_{2_\#}\gamma = \nu\}$ denote the two marginal projections of $\Omega \times \Omega$ to $\Omega$. The solutions are called optimal transport plans or optimal couplings.

Let $q \geq 1$, the q-Wasserstein distance between $\mu$ and $\nu$ in $P(\Omega)$ is simply defined as:

$$W_q(\mu, \nu) = \left( \inf_{\gamma \in \Pi(\mu,\nu)} \int_{\Omega \times \Omega} c(z_1, z_2)^q d\gamma(z_1, z_2) \right)^{1/q}$$

which is the minimum cost induced by the optimal transportation plan.

The Wasserstein distance is desirable for use in designing loss functions in some of the implementations disclosed herein because of its superiority over other probability measures in this context. Some implementations apply the 1-Wasserstein distance, which is also called the earth mover's distance (EMD), to a domain adaptation framework. In some implementations, the discrete version of classifiers' logits $p_1(y|x)$ and $p_2(y|x)$ are considered and computing $W_1(p_1,p_2)$ requires obtaining the optimal transport coupling γ by solving a Linear Programming problem.

To align distributions of source and target by utilizing the task-specific decision boundaries and to incorporate the Wasserstein discrepancy, which has well-behaved energy landscape for stochastic gradient descent training, $W_1(p_1,p_2)$ can be integrated into the maximum classifier discrepancy framework by using the sliced Wasserstein discrepancy, a 1-D variational formulation of 1-Wasserstein distance between the classifiers' logits $p_1$ and $p_2$ along radial projections. A sliced q-Wasserstein discrepancy (SWD) can be defined as:

$$SWD_q(\mu,\nu) = \int_{S^{d-1}} W_q(\mathcal{R}_{\theta\#}\mu, \mathcal{R}_{\theta\#}\nu)d\theta,$$

where $R_{\Theta\#}$ denotes a one-dimensional linear projection operation on the probability measure μ or ν, and Θ is the uniform measure on the unit sphere $S^{d-1}$ in $\mathbb{R}^d$ such that:

$$\int_{S^{d-1}} d\theta = 1.$$

In this manner, computing sliced Wasserstein discrepancy is equivalent to solving several one-dimensional optimal transport problems, which have closed-form solutions.

Specifically, let $\sigma_\alpha$ and $\sigma_\beta$ be the permutations that order the N one-dimensional linear projections of samples such that:

$$\forall\, 0 \leq i < N-1,\; \mathcal{R}_{\theta\#}\mu_{\sigma_\alpha(i)} \leq \mathcal{R}_{\theta\#}\mu_{\sigma_\alpha(i+1)}$$

and $$\mathcal{R}_{\theta\#}\nu_{\sigma_\beta(i)} \leq \mathcal{R}_{\theta\#}\nu_{\sigma_\beta(i+1)},$$

then the optimal coupling γ that minimizes such one-dimensional Wasserstein distance is simply to assign:

$$\mathcal{R}_{\theta\#}\mu_{\sigma_\alpha(i)} \text{ to } \mathcal{R}_{\theta\#}\nu_{\sigma_\beta(i)}$$

using a sorting algorithm. The sliced Wasserstein distance (SWD) is essentially a variational version of original Wasserstein distance but at a fraction of its computational cost. In addition, the SWD is differentiable due to the close-form characteristic, so optimal transport can be used as a reliable fidelity measure to guide the optimization of feature generator and classifiers in the discrepancy framework. The following algorithm provides a summary:

---
Algorithm 1 Sliced Wasserstein Discrepancy for
Unsupervised Domain Adaptation
---

Require: Labeled source set $\{X_s, Y_s\}$, unlabeled target set $X_t$, number of random projections M, and randomly initialized feature generator G and classifiers $C_1$, $C_2$.
while G, $C_1$, and $C_2$ have not converged do
    Step 1: Train G, $C_1$, and $C_2$ on labeled source set:

$$\min_{G,C_1,C_2} \mathcal{L}(X_s, Y_s)$$

Step 2: Train $C_1$ and $C_2$ on unlabeled target set to maximize the sliced Wasserstein discrepancy by:
        Obtain classifiers' output $p_1$ and $p_2$ on target samples
        Sample $\{\theta_1, \ldots, \theta_M\}$ from $S^{d-1}$ in $\mathbb{R}^d$
        Sort $\mathcal{R}_{\theta_{m\#}} p_1$ such that $\mathcal{R}_{\theta_{m\#}} p_{1(j)} \leq \mathcal{R}_{\theta_{m\#}} p_{1(j+1)}$ ---
Algorithm 1 Sliced Wasserstein Discrepancy for
Unsupervised Domain Adaptation
---

Sort $\mathcal{R}_{\theta_{m\#}} p_2$ such that $\mathcal{R}_{\theta_{m\#}} p_{2(j)} \leq \mathcal{R}_{\theta_{m\#}} p_{2(j+1)}$ $$\max_{C_1,C_2} \mathcal{L}_{SWD}(X_t)$$

where $\mathcal{L}_{SWD}(X_t) = \sum_m \sum_j c(\mathcal{R}_{\theta_{m\#}} p_{1(j)}, \mathcal{R}_{\theta_{m\#}} p_{2(j)})$ Step 3: Train G on unlabeled target set to minimize the same sliced Wasserstein discrepancy:

end while $$\min_G \mathcal{L}_{SWD}(X_t)$$

---

Returning to FIG. 1, at block 16, the method 10 further involves adapting the neural network to the target domain by training the generator to decrease Wasserstein distance-based discrepancy. This training can involve using a first set of labeled inputs from the source domain and a second set of inputs corresponding to the target domain. In this training, with the multiple classifier networks fixed, the generator network is trained to generate features that minimize the Wasserstein distance-based discrepancy between the class probability predictions of the multiple classifier networks.

Figure 4:
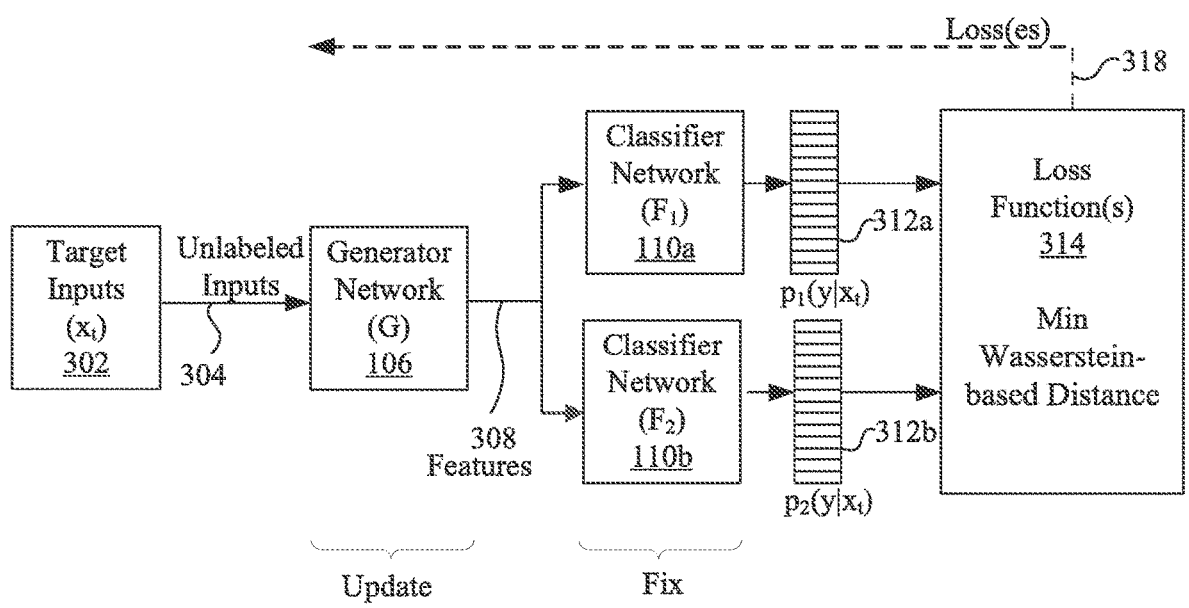
FIG. 4 is a block diagram illustrating another method of adapting the neural network of FIG. 2 to a target domain.

FIG. 4 is a block diagram illustrating a method of adapting the neural network of FIG. 2 to a target domain. The neural network includes the generator network (G) 106, the first classifier network ($F_1$) 110a, and the second classifier network ($F_2$) 110b. In this example, target inputs $x_t$ 302 provides unlabeled inputs 304 that are used. In some implementations, the same number of source inputs $x_s$ 102 and target inputs $x_t$ 302 are used. The inputs are input to the generator network (G) 106. The generator network (G) 106 generates features 308 based on this input. The features 308 are inputted to each of the first classifier network ($F_1$) 110a and the second classifier network ($F_2$) 110b, which classify the features 308 into K classes, producing K-dimensional vectors of logits that are used to generate class probabilities, e.g., K-dimensional probability distributions 312a-b.

The loss function(s) 314 compare(s) the outputs of the first classifier network ($F_1$) 110a to those of the second classifier network ($F_2$) 110b. In some implementations, the following objective is used:

$$\min_G \mathcal{L}_{adv}(X_t)$$

The loss(es) 318 determined by the loss function(s) 314 are propagated back through the neural network to improve the generator network (G) 106, e.g., to reduce the loss(es) 318 at each iteration of the training.

Returning to FIG. 1, the steps of blocks 12, 14, 16 are repeated in some implementations and can be performed in any order. These steps can be repeated a specified number of times, until a desired accuracy level is achieved, or until any other appropriate criteria is satisfied.

At block 18 of the method 10, the neural network is used to classify items from either the source domain or the target domain. In some implementations, the neural network is integrated into an application that is stored on a non-transitory computer-readable medium and executed by a processor to perform such classification. In various implementations, a neural network trained using the techniques disclosed herein is used for semantic segmentation or object detection for an image input corresponding to a target domain. In various implementations, a neural network is trained using images from source domain of synthetic content and automatically generated labels and adapted to a target domain that has unlabeled images of real-world content. In various implementations, the source domain has images of content associated with a first location (e.g., houses, cars, etc., from the United States) and the target domain has images of content associated with a second location (e.g., European houses, cars, etc.).

Figure 5:
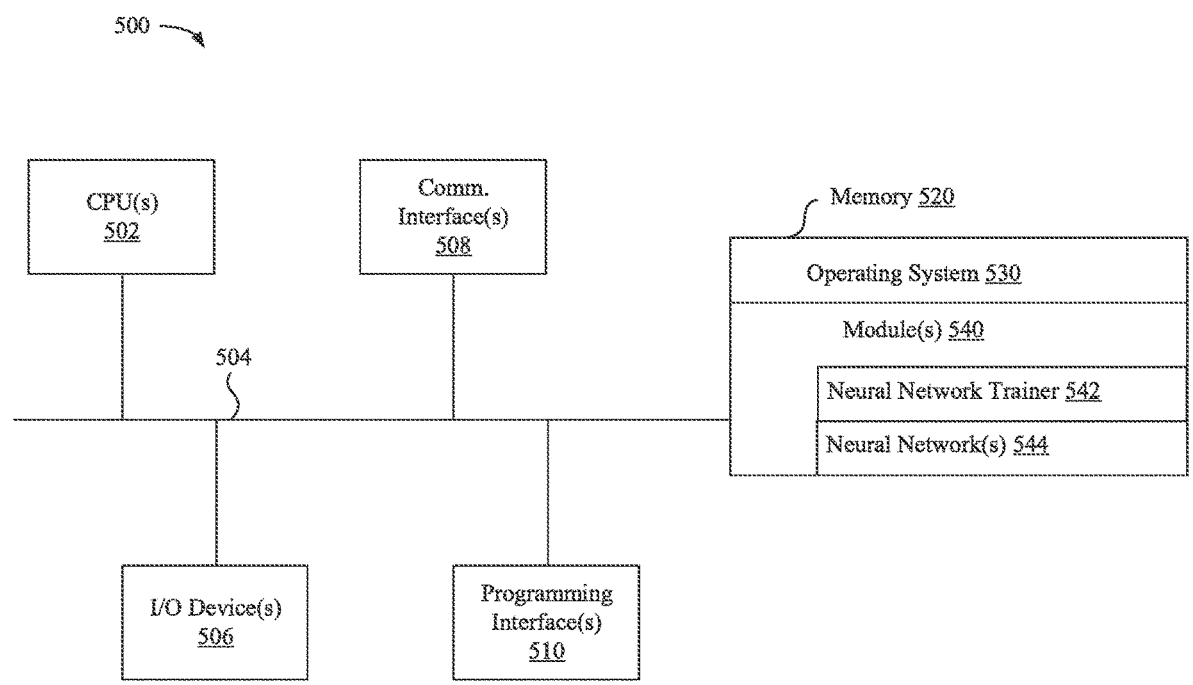
FIG. 5 is a block diagram of an example system architecture of an exemplary device in accordance with some implementations.

FIG. 5 is a block diagram of an example system architecture of an exemplary device configured to train and store a neural network in accordance with one or more implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 500 includes one or more processing units 502 (e.g., microprocessors, ASICs, FPGAs, GPUs, CPUs, processing cores, or the like), one or more input/output (I/O) devices 506, one or more communication interfaces 508 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 510, a memory 520, and one or more communication buses 504 for interconnecting these and various other components.

In some implementations, the one or more communication buses 504 include circuitry that interconnects and controls communications between system components. In some implementations, the one or more I/O devices 506 include at least one of a touch screen, a softkey, a keyboard, a virtual keyboard, a button, a knob, a joystick, a switch, a dial, an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more image sensors, one or more microphones, one or more speakers, a haptics engine, one or more depth sensors (e.g., a structured light, a time-of-flight, or the like), one or more displays, or the like.

In some implementations, the one or more displays correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), or the like display types. In some implementations, the one or more displays correspond to diffractive, reflective, polarized, holographic, etc., waveguide displays. In one example, the device 500 includes a single display or no display.

The memory 520 includes high-speed random-access memory, such as DRAM, SRAM, DDR RAM, or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 comprises a non-transitory computer readable storage medium. In some implementations, the memory 520 or the non-transitory computer readable storage medium of the memory 520 stores the following programs, modules and data structures, or a subset thereof including an optional operating system 530 and one or more modules 540. The operating system 530 includes procedures for handling various basic system services and for performing hardware dependent tasks. The neural network trainer 542 is an example of a module that can be configured to train a neural network according to the techniques disclosed herein. The neural network 544 represents a neural network that has been integrated into an application or otherwise trained and then stored in the memory 520.

FIG. 5 is intended more as a functional description of the various features which are present in a particular implementation as opposed to a structural schematic of the implementations described herein. As recognized by those of ordinary skill in the art, items shown separately could be combined and some items could be separated. The actual number of units and the division of particular functions and how features are allocated among them will vary from one implementation to another and, in some implementations, depends in part on the particular combination of hardware, software, or firmware chosen for a particular implementation.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise.

It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modifications may be implemented by those skilled in the art without departing from the scope and spirit of the invention.

What is claimed is:

1. A method, comprising:
   at an electronic device having a processor:
      training a neural network to classify inputs using a first set of labeled inputs corresponding to a source domain, the neural network comprising:
         a generator network trained to receive the inputs and generate features; and
         a plurality of classifier networks trained to classify the features output from the generator network into classes to obtain class probability predictions; and
      training the neural network to adapt to a target domain using the first set of labeled inputs and a second set of inputs corresponding to a target domain, wherein, with the generator network fixed, the plurality of classifier networks are trained as a discriminator by maximizing a Wasserstein distance-based discrepancy between the class probability predictions.

2. The method of claim 1, wherein training the neural network to adapt to the target domain further comprises, with the plurality of classifier networks fixed, training the generator network to generate features that minimize the Wasserstein distance-based discrepancy between the class probability predictions of the plurality of classifier networks.

3. The method of claim 1, wherein the Wasserstein distance-based discrepancy is determined by solving an optimal transport formulation.

4. The method of claim 1, wherein training the neural network to adapt to the target domain uses a loss function that approximates Wasserstein distance.

5. The method of claim 1, wherein the Wasserstein distance-based discrepancy is determined by approximating Wasserstein distance using a sliced Wasserstein distance technique.

6. The method of claim 1, wherein the plurality of classifier networks comprise two classifier networks that are initialized differently.

7. The method of claim 1, wherein the plurality of classifier networks output multi-dimensional vectors of logits used to generate the class probability predictions as probability distributions on a metric space.

8. The method of claim 1, further comprising integrating the neural network into an application stored on a non-transitory computer-readable medium.

9. The method of claim 1, further comprising using the neural network to classify an unlabeled input corresponding to the target domain.

10. The method of claim 9, wherein the neural network is used for semantic segmentation or object detection for an image input corresponding to the target domain.

11. The method of claim 1, wherein the source domain has images of synthetic content and the target domain has images of real-world content.

12. The method of claim 1, wherein the source domain has images of content associated with a first location and the target domain has images of content associated with a second location.

13. A system comprising:
   a non-transitory computer-readable storage medium; and
   one or more processors coupled to the non-transitory computer-readable storage medium, wherein the non-transitory computer-readable storage medium comprises program instructions that, when executed on the one or more processors, cause the system to perform operations comprising:
      training a neural network to classify inputs using a first set of labeled inputs corresponding to a source domain, the neural network comprising:
         a generator network trained to receive the inputs and generate features; and
         a plurality of classifier networks trained to classify the features output from the generator network into classes to obtain class probability predictions; and
      training the neural network to adapt to a target domain using the first set of labeled inputs and a second set of inputs corresponding to a target domain, wherein, with the generator network fixed, the plurality of classifier networks are trained as a discriminator by maximizing a Wasserstein distance-based discrepancy between the class probability predictions; and
      training the neural network to adapt to the target domain by training the generator network to generate features that minimize the Wasserstein distance-based discrepancy between the class probability predictions of the plurality of classifier networks.

14. The system of claim 13, wherein the system is configured to determine Wasserstein distance-based discrepancy by solving an optimal transport formulation.

15. The system of claim 13, wherein the system is configured to train the neural network to adapt to the target domain using a loss function that approximates Wasserstein distance.

16. The system of claim 13, wherein the system is configured to determine the Wasserstein distance-based discrepancy by approximating Wasserstein distance using a sliced Wasserstein distance technique.

17. The system of claim 13, wherein the plurality of classifier networks comprise two classifier networks that are initialized differently.

18. The system of claim 13, wherein the plurality of classifier networks output multi-dimensional vectors of logits used to generate the class probability predictions as probability distributions on a metric space.

19. A non-transitory computer-readable storage medium, storing program instructions computer-executable on a computer to perform operations comprising:
- training a neural network to classify inputs using a first set of labeled inputs corresponding to a source domain, the neural network comprising:
  - a generator network trained to receive the inputs and generate features; and
  - a plurality of classifier networks trained to classify the features output from the generator network into classes; and
- training the neural network to adapt to a target domain using a loss function that accounts for a Wasserstein distance-based discrepancy between outputs of the classifier networks.

20. The non-transitory computer-readable storage medium of claim 19, wherein training the neural network to adapt to the target domain comprises:
- training the plurality of classifier networks by maximizing the Wasserstein distance-based discrepancy between class probability predictions of the plurality of classifier networks; and
- training the generator network to generate features that minimize the Wasserstein distance-based discrepancy between the class probability predictions.

* * * * *